(12) United States Patent
Meyer et al.

(10) Patent No.: US 6,202,699 B1
(45) Date of Patent: Mar. 20, 2001

(54) SOLENOID VALVE

(75) Inventors: Roland Meyer, Roth; Alfred Trzmiel, Grafenberg, both of (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/259,523

(22) Filed: Feb. 26, 1999

(30) Foreign Application Priority Data

Feb. 27, 1998 (DE) .............................. 198 08 279

(51) Int. Cl.[7] .................................................. F16K 31/06
(52) U.S. Cl. .................................... 137/884; 251/129.15
(58) Field of Search .................................. 137/884, 271; 251/129.15, 129.01; 303/119.2; 335/255, 278

(56) References Cited

U.S. PATENT DOCUMENTS

| | | | |
|---|---|---|---|
| 4,988,073 | * | 1/1991 | Cristiani ..................... 251/129.15 X |
| 5,636,908 | * | 6/1997 | Yamamuro ..................... 303/119.2 X |
| 5,788,343 | * | 8/1998 | Kurtz et al. ..................... 303/119.2 |

* cited by examiner

*Primary Examiner*—Kevin Lee
(74) *Attorney, Agent, or Firm*—Robert W. Becker & Associates

(57) ABSTRACT

A solenoid valve has a solenoid component having at least one plunger. At least one valve component having a housing and a piston slidably mounted in the housing is provided. The at least one valve component and the solenoid component are connected to one another. At least one seal, connected to the solenoid component or the at least one valve component, is provided for sealing the solenoid valve relative to a support on which the solenoid valve is mounted.

26 Claims, 2 Drawing Sheets

SOLENOID VALVE

BACKGROUND OF THE INVENTION

The present invention relates to a solenoid valve comprising a valve component and a solenoid component including a plunger connected to a piston which is arranged in the valve component housing connected to a support.

In known solenoid valves of this kind the valve component and the solenoid component are separate parts which are combined to form a unit. The solenoid component has a plunger positioned on an amature. The plunger is guided in the vicinity of its two ends in a respective bearing and penetrates into a yoke that, at the end facing the valve component, is sealed by a seal and positioned in the coil. At its lower end, the coil is sealed by a further seal relative to a magnetic ground element (back iron) of the valve component. The back iron or magnetic ground element is sealed by a further seal relative to the housing of solenoid component. Finally, between a plug part of the solenoid component and the solenoid component housing a further seal is provided. Due to the plurality of seals as well as the required bearings for the plunger, the solenoid valve is of a complicated construction and is thus accordingly rather expensive. The plurality of seals also results in the solenoid valve being relatively large. Its mounting is also complicated and expensive. Finally, the solenoid component housing is comprised of metal and must therefore be galvanized at the exterior in order to prevent corrosion. This corrosion treatment requires additional working steps and further increases the costs of manufacturing the solenoid valve.

It is therefore an object of the present invention to embody a solenoid valve of this kind such that it is comprised of only a few components and can be produced with minimal cost and minimal mounting expenditure as well as a minimal constructive size.

SUMMARY OF THE INVENTION

The object of the present invention is solved in that at least one seal is provided between the support and the solenoid component and/or the valve component.

In another embodiment, wherein the solenoid valve has at least one connector pin that is electrically connected to a winding of a coil of the solenoid component and projects into the plug part of the solenoid compartment housing, the object is solved by sealing the connector pin with a second seal relative to the solenoid housing.

According to a further embodiment, the connector pin is embodied by a round pin having one end that is crimped in order to form the pin portion.

In another embodiment of the present invention, wherein the solenoid component has a plunger which is connected to a piston arranged within the housing of the valve component and in which an amature is positioned on the plunger, the amature is guided by the piston within the valve component housing.

By providing between the solenoid component and/or the valve component and the support a seal, it is possible to eliminate all seals for sealing the magnetic ground element, the coil, and the yoke.

By arranging the second seal between the solenoid component housing and the connector pin, further seals for sealing the plug part relative to the solenoid component housing can be eliminated. The seal can be, for example, a simple O-ring.

The connector pin may be embodied as an inexpensive component when using a round pin. By crimping one end of the round connector pin, the required rectangular cross-section of the pin portion is provided. The remaining portion of the connector pin maintains the circular or round cross-sectional shape so that in this area a conventional inexpensive O-ring can be used for sealing the connector pin.

By guiding the amature by means of the piston within the valve component housing, expensive bearings for the plunger can be eliminated.

By eliminating a plurality of seals and bearings, the inventive solenoid valve is constructively simplified. Furthermore, it has a relatively small constructive size and can be designed to be very small. Accordingly, the inventive solenoid valve can be used with advantage in modular systems in which a plurality of solenoid valve units are to be provided.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
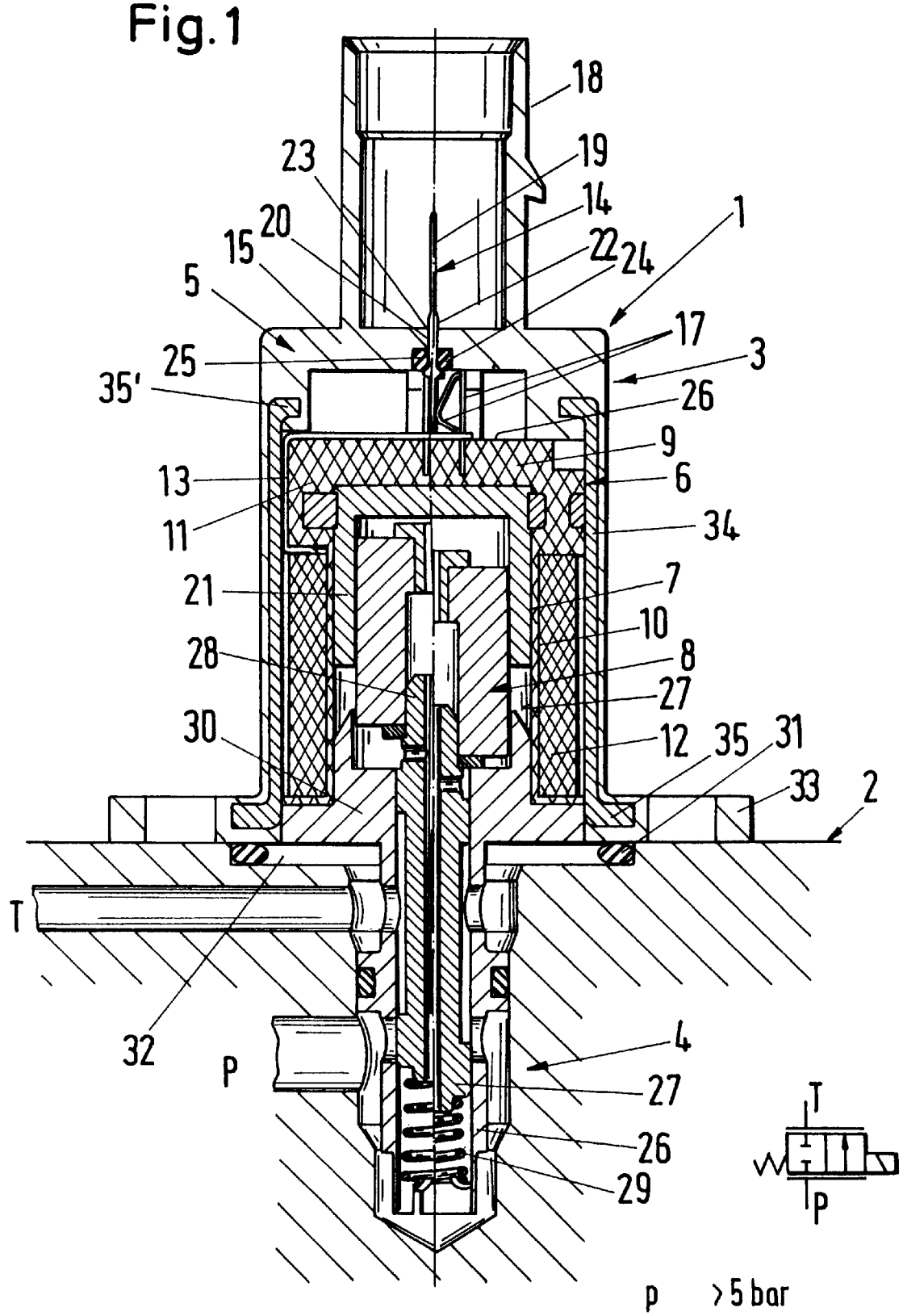
FIG. 1 shows the inventive solenoid valve supported on a support in axial section.

The present invention will now be described in detail with the aid of several specific embodiments utilizing FIGS. 1 and 2.

The solenoid valve 1 is supported on a support 2, for example, an engine block etc., and has a solenoid component 3 and a valve component 4. The solenoid component 3 has, as is known in the art, a housing 5 in which a yoke 7 surrounded by a coil member 6 is positioned in which the armature 8 is axially moveable. The coil member 6 has a cup-shaped spool body 11 with a bottom 9 and a cylindrical mantle 10 in which a coil 12 is arranged. As is known in the prior art, wires 13 are guided to a connector pin 14 which projects through the bottom 15 of the cup-shaped solenoid component housing 5. A cylindrical plug portion 18 projects from the bottom 15. The connector pin 14 with its narrow pin portion 19 projects into the plug portion 18. In the housing bottom 15 a through opening 20 is provided through which the connector pin 14, having a securing portion 22 with round cross-section, projects. The connector pin 14 is electrically connected with wires 13 to the coil 12 and the contact parts 17. The free end 23 of the securing portion 22 is widened and rests at a seal 24 which is positioned at an inner depression 25 of the housing bottom 15 into which the through opening 20 opens. Preferably, the seal 24 is a simple O-ring which surrounds the securing portion 22. The widened portion 28 clamps the sealing ring 24 radially and axially in the depression 25. By providing the circular securing portion 22 the connector pin 14 can be sealed with a simple annular seal 24 relative to the exterior.

The connector pin 14 is produced from a pin which initially has a round cross-section and is crimped at one end in order to form the pin portion 19. The remaining (uncrimped) part maintains its round shape.

The contact parts 17 are secured to the bottom 9 of the coil body 11. The yoke 7 rests at the inner wall of the coil mantle 10. The armature 8 rests at the inner wall of the cylindrical part 21 of the yoke 7 and is seated on a plunger 28 which is axially fixedly connected to the piston 27 of the valve component 4. It is preferably a unitary part of the piston 27. The valve component 4 has a housing 26 in which the piston 27 is axially moveably guided against the force of a spring 29. Since the armature 8 is guided by the piston 27 within the valve component housing 26, an additional guiding for the armature 8 within the solenoid component housing 5 is no longer required. This is advantageous with respect to the manufacturing costs of the solenoid valve as well as with respect to mounting and constructive size.

The piston 27 is comprised of a non-magnetic material, preferably a metal. The valve housing 26 has a unitary conical magnetic ground element (back iron) 30 that penetrates into the coil mantle 10 and ends at a spacing from the yoke 7, respectively, its cylindrical part 21. The armature 8 projects with minimal radial play into the magnetic ground element 30. Due to the unitary design of the valve component housing 26 and the magnetic ground element 30, the solenoid valve is constructively simplified.

A further advantage with respect to the manufacturing costs is that the solenoid component housing 5 is comprised of plastic. Thus, in comparison to metal housings, the required corrosion treatment is no longer needed. The plastic material of the solenoid component housing 5 is corrosion-resistant and thus does not lead to any problems for applications of the solenoid valve.

The solenoid valve 1 is sealed relative to the support 2 by a seal 31 in a reliable manner. The seal 31 is arranged in a depression 32 of the support 2 that is open to the exterior. It is positioned concentrically to the valve component housing 26. The seal 31 is advantageously an O-ring which rests at a radially outwardly projecting flange 33 of the solenoid component housing 5. The solenoid component housing 5 is fastened by the flange 33 by non-representative fasteners, for example, screws, to the support 2. When attaching the solenoid component housing 5 to the support 2, the seal 31 is elastically compressed. A cylindrical magnetic ground element (back iron) 34 is arranged within the solenoid component housing 5 and is connected preferably by injection-molding. At the end facing the valve component it has a radially outwardly projecting flange 35 which is positioned within the flange 33 of the solenoid component 5. At the other end the magnetic ground element 34 has a radially inwardly projecting annular flange 35' which is embedded in the housing bottom 15. The magnetic ground element 34 provides grounding of the magnetic field of the magnetic component 3. The flanges 35, 35' extending in opposite directions are advantageous when the solenoid valve is used in connection with very high pressures. The flanges 35, 35' provide a secure attachment of the magnetic ground element 34 within the solenoid component housing 5. When reduced pressures are employed, a simple cylindrical tube portion is sufficient as a magnetic ground element 34.

The valve component 4 has a pressure connector P and a tank connector T. The two connectors P, T are opened and closed by the piston 27.

The two seals 24, 31 are sufficient to seal off the solenoid valve in a reliable manner. The two seals can be comprised of simple O-rings so that the solenoid valve has a very simple constructive design. Furthermore, it is of minimal constructive height so that it can be employed well in a modular system which is represented in an exemplary manner in FIG. 2. It is comprised of a plurality of solenoid valve units having respective valve components.

Figure 2:
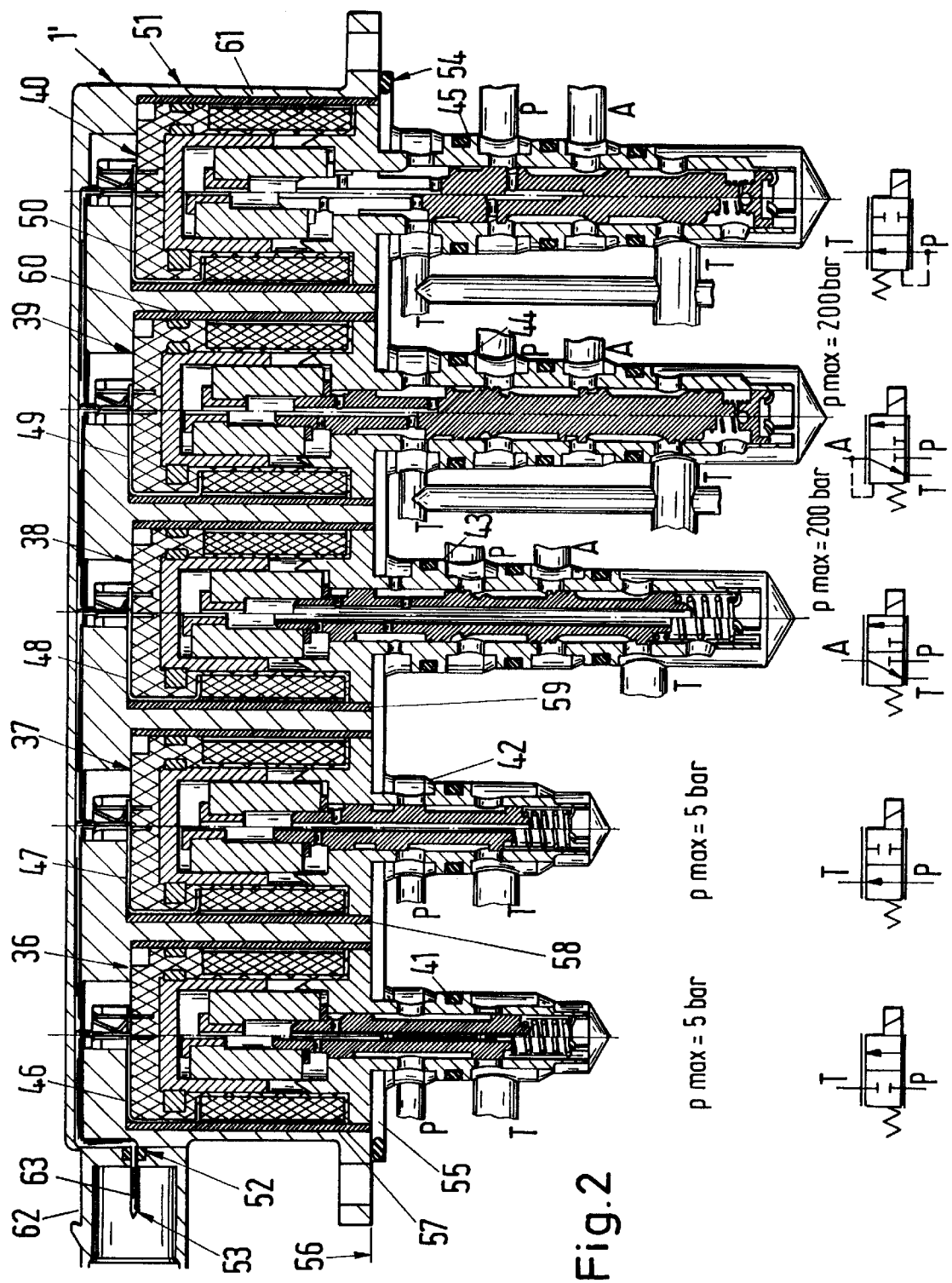
FIG. 2 shows a plurality of adjacently arranged solenoid valve units, which are provided on a common support and housed in a common housing, in a representation corresponding to FIG. 1.

In the embodiment according to FIG. 2, five solenoid valve units 36 through 40 are provided which are substantially embodied identical to the design of the solenoid valve 1. Only the valve components 41 through 45 are different with respect to the desired hydraulic function. The valve components 41, 42, and 45 have each a pressure connector P and a tank connector T, while the valve components 43, 44 in addition have a working connector A. The solenoid components 46 through 50 are of identical design. All of the solenoid valve units 36 through 40 have a common solenoid component housing 51. It is comprised advantageously of plastic material, as suggested in connection with the solenoid component housing 5. For sealing the solenoid valve units 36 through 40 only two seals are required, i.e., the seal 52 which seals the connector pin 53 and the seal 54 which is positioned in a depression 55 of the support 56. Both seals 52 and 54 are embodied as simple O-rings. Each solenoid valve unit 36 through 40 has a cylindrical magnetic ground element 57 through 61 which is embedded in the common housing 51. The magnetic ground elements 57 through 61 are of identical design. They are embodied in analogy to the magnetic ground element 34 of FIG. 1, but without the outwardly or inwardly angled flanges 35 and 35'. The connector pin 53, like the connector pin 14, comprises a round securing portion (not represented) and a pin portion 63 that is in cross-section rectangular and projects into the plug part 62 of the solenoid valve units 36 through 40. The solenoid valve units 36 through 40 must not be embodied with different dimensions, as shown in FIG. 2; they can have the same size and design or can be partly of the same design. Furthermore, for a solenoid valve in a modular embodiment, the number of solenoid valve units can be varied.

The solenoid valves can cover a pressure range of, for example, five bar through, for example, 200 bar with different hydraulic functional features. Since the different solenoid valve units must not each have an individual housing, a common housing 51 is possible, so that the solenoid valve units can be arranged very closely next to one another. The entire modular system thus requires only a minimal mounting space.

The magnetic ground elements 57 through 61 comprised of iron can thus be made of a simple cylindrical tubular piece since in combination of the individual solenoid valve units 36 through 40 even at high pressures the solenoid housing 51 has sufficient stability.

The specification incorporates by reference the disclosure of German priority document 198 08 279.7 of Feb. 27, 1998.

The present invention is, of course, in no way restricted to the specific disclosure of the specification and drawings, but also encompasses any modifications within the scope of the appended claims.

What is claimed is:

1. A solenoid valve comprising:
   a solenoid component (3) having at least one plunger (28);
   at least one valve component (4) having a housing (26) and a piston (27) slidably mounted in said housing (26), wherein said housing (26) of said at least one valve component (4) has a widened portion (30) projecting into a housing (5, 52) of said solenoid component (3), wherein said widened portion (30) is a unitary part of said housing (26) of said at least one valve component (4), and wherein said widened portion is a magnetic ground element;
   said at least one valve component (4) and said solenoid component (3) connected to one another;
   at least one seal (31, 54), connected to said solenoid component (4) or said at least one valve component, sealing said solenoid valve relative to a support on which said solenoid valve is mounted.

2. A solenoid valve according to claim 1, wherein said at least one seal (32, 54) is annular.

3. A solenoid valve according to claim 1, wherein a depression (32, 55) is provided in the support and said at least one seal (31, 54) is positioned in said depression (32, 55).

4. A solenoid valve according to claim 1, wherein said solenoid component (3) has a housing (5, 51) with a flange (33) for fastening said housing (5, 51) of said solenoid component (3) to the support and wherein said at least one seal (31, 54) rests at said flange (33).

5. A solenoid valve according to claim 4, wherein:
said housing (5, 51) of said solenoid component (3) has a plug part (18, 62);
said solenoid component (3) has at least one coil member (6) comprised of a coil (12);
said solenoid component (3) has a connector pin (14, 53) electrically connected to said coil (12) of each one of said coil members (6);
said connector pin (14, 53) projects into said plug part (18); and
said connector pin (14, 53) has a seal (24, 52) sealing said connector pin (14, 53) relative to said housing (5, 51) of said solenoid component (3).

6. A solenoid valve according to claim 5, wherein said connector pin (14, 53) has a securing portion (22) having a round cross-section and wherein said securing portion (22) is arranged in said housing (5, 51) of said solenoid component (3).

7. A solenoid valve according to claim 6, wherein said seal (24, 52) of said connector pin (14, 53) sealingly surrounds said securing portion (22).

8. A solenoid valve according to claim 5, wherein said connector pin (14, 53) has a pin portion (19, 63) positioned in said plug part (18, 62) and wherein said pin portion (19, 63) has a non-circular cross-section.

9. A solenoid valve according to claim 8, wherein said pin portion (19, 63) has a rectangular cross-section.

10. A solenoid valve according to claim 5, wherein said seal (24, 52) of said connector pin (14, 53) is an O-ring.

11. A solenoid valve according to claim 5, wherein said seal (24, 52) of said connector pin (14, 53) is axially and radially clamped within said housing (5, 51) of said solenoid component (3).

12. A solenoid valve according to claim 10, wherein:
said housing (5, 51) of said solenoid component (3) has a depression (25) in which said seal (24, 52) of said connector pin (14, 53) is positioned;
said connector pin (14, 53) has a radially widened portion (23);
said seal (24, 52) of said connector pin (14, 53) is pressed by said radially widened portion (23) into said depression (25).

13. A solenoid valve according to claim 8, wherein said connector pin (14, 53) is a round pin and wherein said pin portion (19, 63) having a non-circular cross-section is made by crimping an end of said round pin.

14. A solenoid valve according to claim 1, wherein said solenoid component comprises for each one of said plungers (18) an armature (8) positioned on said plunger (18), wherein said armature (8) is guided by a cooperating one of said pistons (17) in said housing (26) of said at least one valve component (4).

15. A solenoid valve according to claim 1, wherein said plunger (28) and said piston (27) are a unitary part.

16. A solenoid valve according to claim 1, wherein at least one of said piston (27) and said plunger (28) consists of a non-magnetic material.

17. A solenoid valve according to claim 16, wherein said non-magnetic material is a metal.

18. A solenoid valve according to claim 1, wherein said solenoid component (3) has a housing (5, 52) consisting of plastic.

19. A solenoid valve comprising:
a solenoid component (3) having at least one plunger (28), wherein said solenoid component (3) comprises at least one magnetic ground element (34, 57–61) arranged in a housing (5, 52) of said solenoid component (3);
at least one valve component (4) having a housing (26) and a piston (27) slidably mounted in said housing (26), wherein said housing (26) of said at least one valve component (4) has a widened portion (30) projecting into a housing (5, 52) of said solenoid component (3), wherein said widened portion (30) is a unitary part of said housing (26) of said at least one valve component (4);
said at least one valve component (4) and said solenoid component (3) connected to one another;
at least one seal (31, 54), connected to said solenoid component (4) or said at least one valve component, sealing said solenoid valve relative to a support on which said solenoid valve is mounted.

20. A solenoid valve according to claim 19, wherein said at least one magnetic ground element (34, 57–61) is embedded in said housing (5) of said solenoid component (3).

21. A solenoid valve according to claim 19, wherein said at least one magnetic ground element (34, 57–61) is substantially cylindrical.

22. A solenoid valve according to claim 21, wherein said at least one magnetic ground element (34, 57–61) has opposed ends and wherein said opposed ends each have a radial flange (35, 35'), said radial flanges (35, 35') pointing in opposite directions.

23. A solenoid valve comprising:
a solenoid component (3) having at least one plunger (28):
at least one valve component (4) having a housing (26) and a piston (27) slidably mounted in said housing (26), wherein said solenoid component (3) comprises a plurality of solenoid units (36–40) and has a common housing (52) for said solenoid units (36–40), wherein each one of said solenoid units (36–40) has one of said valve components (4) connected thereto, and wherein each one of said solenoid units (36–40) has a magnetic ground element (57–61);
said at least one valve component (4) and said solenoid component (3) connected to one another;
at least one seal (31, 54), connected to said solenoid component (4) or said at least one valve component, sealing said solenoid valve relative to a support on which said solenoid valve is mounted.

24. A solenoid valve according to claim 23, wherein said magnetic ground elements (57–61) are embedded in said common housing (52).

25. A solenoid valve according to claim 23, wherein said housing (26) of said at least one valve component (4) has a widened portion (30) projecting into a housing (5, 52) of said solenoid component (3), wherein said widened portion (30) is a unitary part of said housing (26) of said at least one valve component (4).

26. A solenoid valve according to claim 25, wherein said widened portion is a magnetic ground element.

* * * * *